May 11, 1926.
W. E. SLOAN
VALVE
Filed April 28, 1924
1,584,404
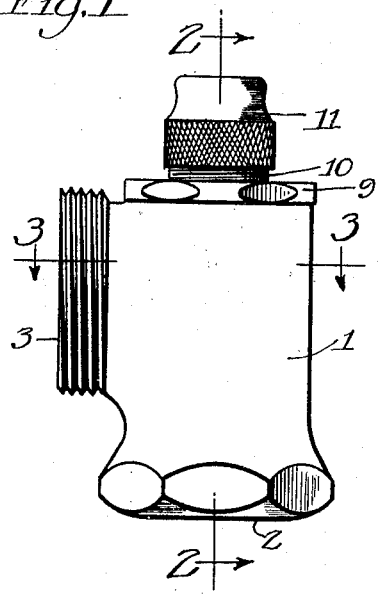
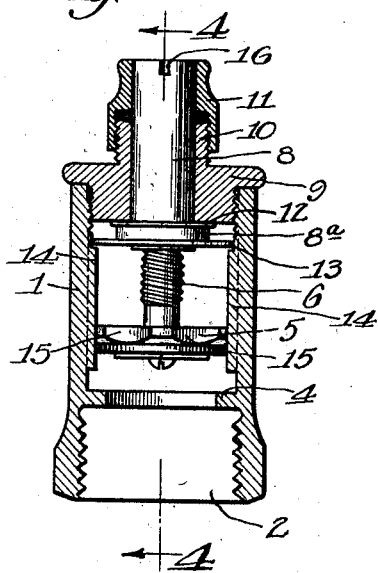
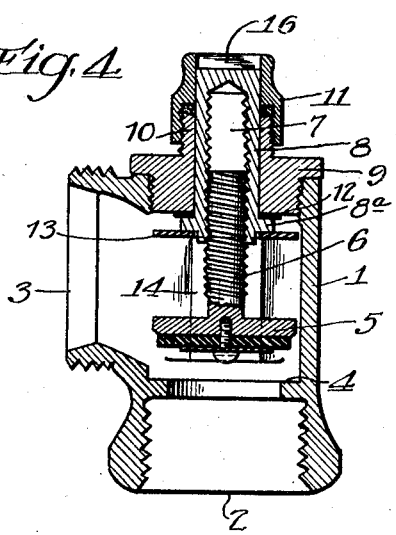
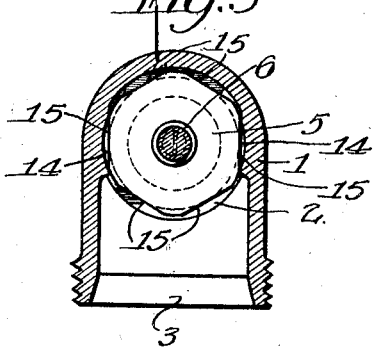

Patented May 11, 1926.

1,584,404

UNITED STATES PATENT OFFICE.

WILLIAM E. SLOAN, OF CHICAGO, ILLINOIS.

VALVE.

Application filed April 28, 1924. Serial No. 709,363.

This invention relates to valves and has for its object to provide a new and improved device of this description. The invention has as a further object to provide a valve particularly adapted for throttling the flow of water, as for example, the water passing to the flush valve. The invention has other objects which are more particularly pointed out in the accompanying drawings.

Referring now to the drawings—

Figure 1 is a side elevation of one form of valve embodying the invention;

Figure 2 is a sectional view taken on line 2—2 of Figure 1;

Figure 3 is a sectional view taken on line 3—3 of Figure 1;

Figure 4 is a sectional view taken on line 4—4 of Figure 2.

As herein shown the valve comprises a casing 1 having the inlet 2 and the outlet 3. Within the casing is a seat 4 for the valve 5. This valve 5 is connected with a stem 6 which is screw threaded, the end projecting into a screw threaded opening 7 in the rotatable member 8, which projects through the end 9 of the valve. Said end 9 is screw threaded into the valve casing and is provided with a threaded projection 10 which receives the hollow cap 11.

The rotatable member 8 is provided with a shoulder 8ᵃ which prevents its upward movement. The washer 12 is preferably located between the shoulder and the end piece 9. On the other side of the shoulder is a stop 13 which is herein shown as a separate disc. This stop rests upon the upper ends of the flat portions 14 on the interior of the valve, (see Fig. 2) which are engaged by the flat portions 15 on the valve 5 and which prevent the rotation of the valve 5 when the member 8 is rotated.

It will be noted that the inner wall of the casing has two flat faces connected together by a curved face and that the valve has a series of flat faces arranged in pairs opposite each other, one pair of said flat faces engaging the flat faces on the inner wall of the casing. This provides a construction that can be easily and cheaply made and easily assembled, as the parts are properly assembled when any pair of the flat faces of the valve engages the flat faces of the casing.

When the member 8 is rotated in one direction the valve is moved to throttle or cut off the liquid supply and when moved in the other direction to open or enlarge the opening through the valve. The member 8 may be moved in any desired manner. As herein shown it is provided with a groove 16 for a wrench or other device, by means of which it may be turned.

It will thus be seen that the rotating part 8 is prevented from moving longitudinally toward the valve seat by a stop carried thereby which engages the ends of the flattened portions of the valve casing which prevent the rotation of the valve 15. It will further be seen that this provides a cheap, efficient and easily manufactured and assembled valve for the purposes set out.

It will further be seen that the stop 13 prevents the valve from falling down, the valve being held in any desired position. This stop also prevents the piece 8 from falling down.

It is important in this construction that the part 8 have a part connected therewith which acts as a stop to hold the valve and the part 8 in position.

I claim:

1. A valve device comprising a casing, a valve in said casing, said valve having a flat edge, a flat wall surface in the interior of the casing engaged by the flat edge of the valve so that the valve may be reciprocated but not rotated, a stem for said valve, a rotatable device having screw threaded engagement with said stem and projecting beyond the casing, a stop associated with said rotatable device which engages the end of the flattened portion of the wall of the casing so as to prevent longitudinal movement of the rotatable device.

2. A valve device comprising a casing, a valve in said casing, said casing being provided with two opposed interior flattened wall portions, a stem connected with said valve, a rotatable part projecting through the casing and having a screw threaded engagement with said stem, a stop associated with said rotatable part and engaging the upper ends of said flattened wall portions of the casing so as to prevent longitudinal movement of the rotatable device toward the valve 3. A valve device comprising a casing, the inner wall of the casing having two opposed flat faces connected by a curved face, a valve in said casing having a series of flat faces arranged in pairs, the two faces of each pair being opposite each other, one pair of said flat faces engaging the flat faces on the interior of the casing, and means for sliding the valve along said flat faces to open and close it.

Signed at Chicago county of Cook and State of Illinois, this 12th day of April, 1924.

WILLIAM E. SLOAN.